Figure 1:
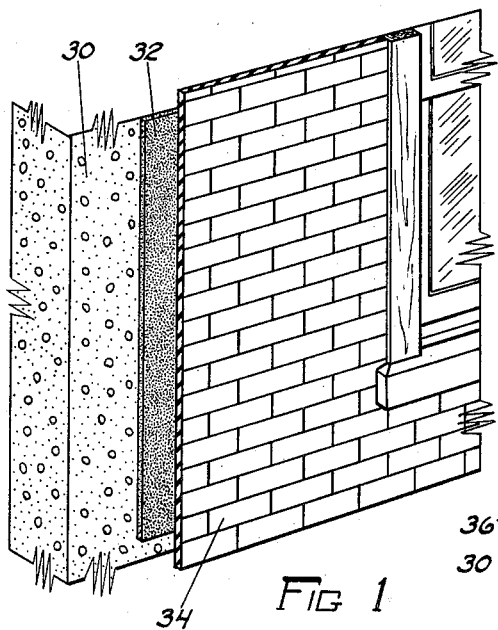

Nov. 3, 1936.                A. REISIG                2,059,490
                           BUILDING UNIT
                       Filed Jan. 2, 1936           3 Sheets-Sheet 1

CONTRASTING COLOR

INVENTOR.
ANTOINETTE REISIG
BY Bonifant Hamilton
ATTORNEYS.

Nov. 3, 1936.  A. REISIG  2,059,490
BUILDING UNIT
Filed Jan. 2, 1936  3 Sheets-Sheet 2
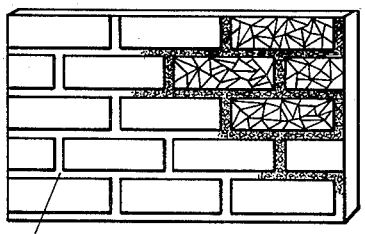  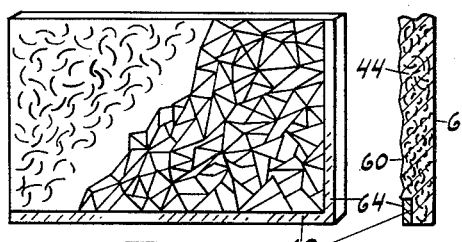
Fig 8  Fig 9  Fig 10  Fig 11
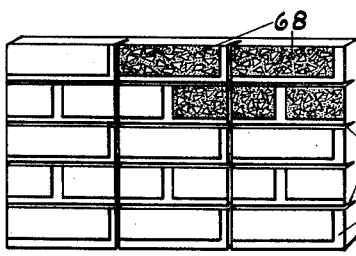 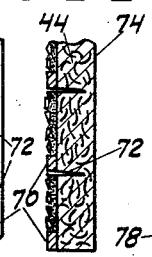 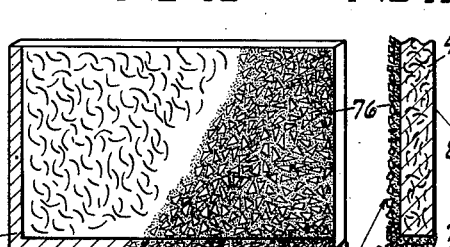 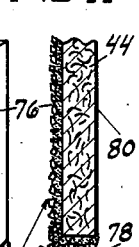
Fig 12  Fig 13  Fig 14  Fig 15
CONTRASTING COLOR
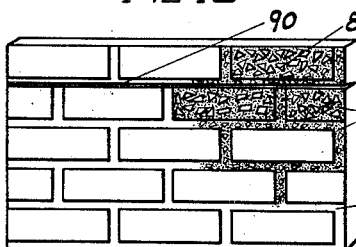 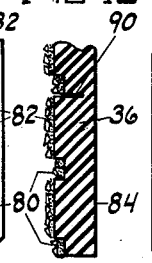 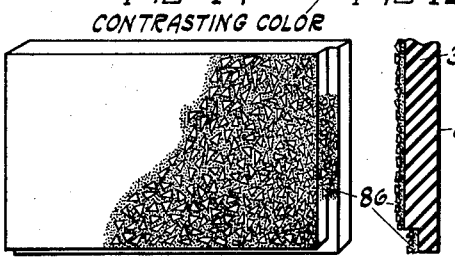 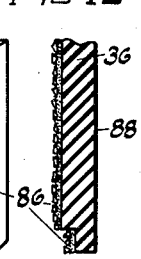
Fig 16  Fig 17  Fig 18  Fig 19
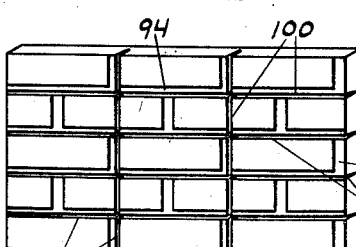 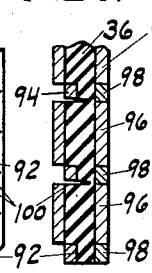 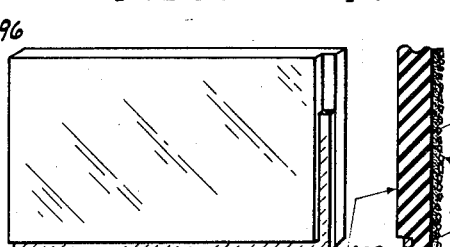 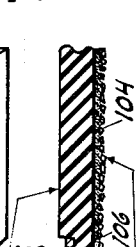
Fig 20  Fig 21  Fig 22  Fig 23
CONTRASTING COLOR
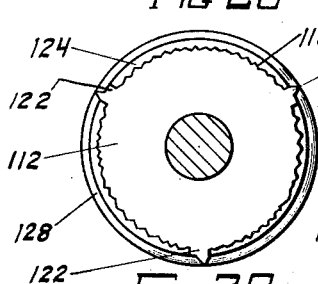 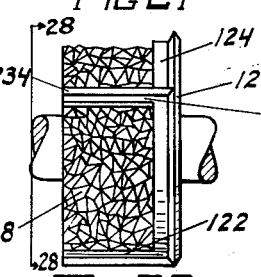
Fig 29  Fig 28
INVENTOR.
ANTOINETTE REISIG
BY
ATTORNEYS.

Nov. 3, 1936.　　　A. REISIG　　　2,059,490
BUILDING UNIT
Filed Jan. 2, 1936　　　3 Sheets-Sheet 3
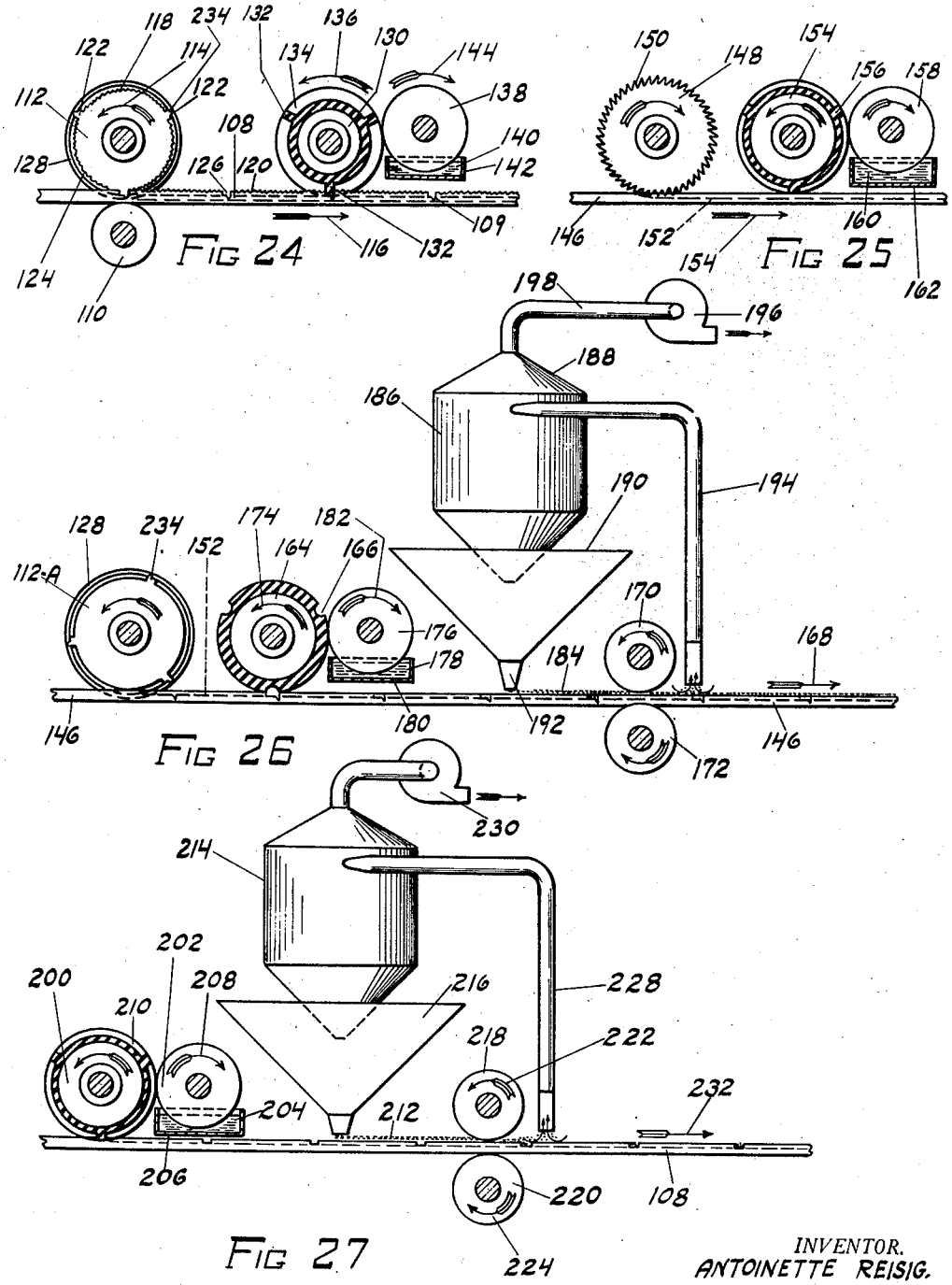
INVENTOR.
ANTOINETTE REISIG.
ATTORNEYS.

Patented Nov. 3, 1936

2,059,490

UNITED STATES PATENT OFFICE 2,059,490

BUILDING UNIT

Antoinette Reisig, Fords, N. J.

Application January 2, 1936, Serial No. 57,204

2 Claims. (Cl. 72—18)

In the present invention, there is presented an improved form of a building unit which may be used as a veneering for walls of buildings where it is desired to simulate brick, tile, or other selected finish of a highly diversified character, and which may be applied directly to a foundation structure by embedding in a suitable viscous cement, and without requiring the use of any securing instrumentalities other than the cement layer in which the respective individual units of the improved construction are embedded.

More specifically, the invention comprises a building unit of the above indicated character which is produced in large slabs, and which may be applied in such large slabs to the wall foundation by embedding the slabs in the cement layer. The material of these slabs may be of various materials of an asphaltic nature, or it may be of an asbestos composition, or the like, the surface of which may be finished on one side in one manner, as by the application of a granular or mineral-like dressing, with a different type of finish on the reverse side so as to enable the production of different effects to the wall depending upon which side of the slab is placed outwardly. At least one of the slab surfaces may be divided into suitable designs, by impressing or printing upon the base suitable markings, such as grooves, lines, or the like, which markings are finished in colors contrasting with the general color of the slab. These markings enable the slab to resemble brick of the standard type with the contrasting colors simulating mortar lines, or many other varieties of designs may be employed.

One of the features of the improved unit lies in the application of breakage or cleavage lines to the body of the slab, whereby individual small units may be readily broken from the large slab as desired, as when areas smaller than the area of one of the large slabs is to be covered. In this way, a high degree of flexibility may be obtained in the application and adaptation of the unit to any desired wall space.

A further feature of the invention lies in the manner of producing the improved unit of the present invention, with particular reference to the application of the markings and contrasting colors to the surfaces of the unit, and also to the manner of applying the cleavage or breakage lines, which may be done substantially simultaneously with the application of the markings and contrasting coloring defining the particular design which is being applied to the surface of the slab.

In carrying out the features of the invention, the particular mode of operation depends largely upon the material comprising the body of the slab. That is to say, if the slab is composed of some hard material such as a pressed asbestos composition, for example, the lines may be applied by a printing roll or the like, carrying the contrasting coloring to simulate mortar lines, and the breakage lines may be applied by a cutter such as a rotary saw positioned preferably in advance of the printing rolls; or if the simulated mortar lines be produced in other ways, as for example by cutting a groove in the pressed composition of the slab, rotary milling cutters may be employed for cutting these grooves, which may then be filled with some material of a color contrasting to the color of the body of the slab. Such material may be a granulated mineral substance which has been suitably colored; or if the slab itself is made of some relatively soft material, such as an asphaltic composition, the breakage lines may be applied by providing the roll with a cutting edge, and also with longitudinally extending ribs or the like to press the aforesaid grooves into the body of the slab, as will be described in detail hereinafter.

Further objects and advantages of the invention will become apparent as the description proceeds, and the features of novelty will be set forth specifically in the appended claims. The invention accordingly comprises the several steps and the relation and order of one or more of such steps with respect to each of the others, and the product possessing the features which are exemplified in the following detailed disclosure, and the scope of the application of which will be indicated in the claims.

From the foregoing it will be apparent that the present invention provides a building unit which is in the nature of an imitation of unglazed brick or tile preferably in flexible or plastic sheets provided with division lines which enable the sheet to be divided into smaller portions defining one or more individual units.

Figure 2:
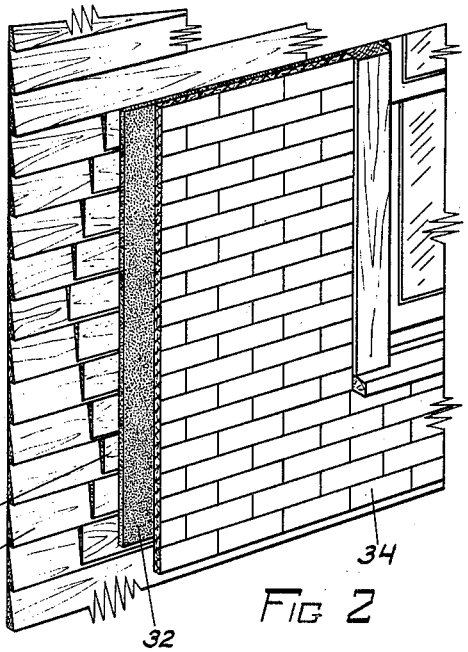
Figure 3:
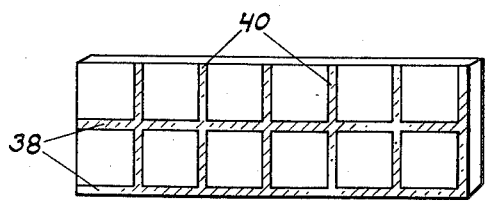
Figure 4:
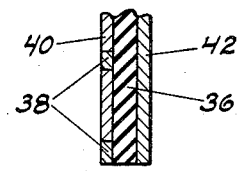
Figure 5:
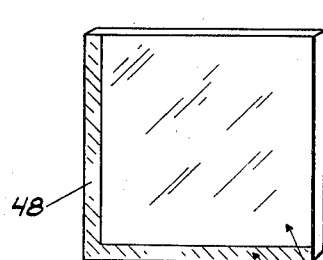
Figure 6:
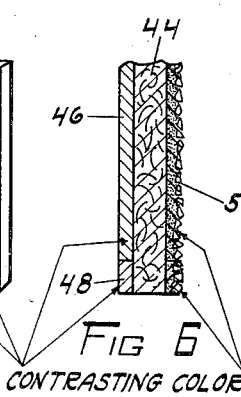
Figure 7:
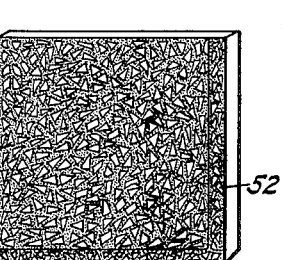

The invention will be more readily understood by reference to the accompanying drawings, which are illustrative of certain features of the invention, and in which Fig. 1 represents a fragmentary perspective view of a wall construction embodying the improved building unit of the present invention, the unit being shown as applied to a stucco foundation, Fig. 2 is a similar view to Fig. 1, but illustrates one way of applying the improved unit to the usual weather-boarding of a wall of frame construction, Fig. 3 represents a portion of one form of the present improved unit, showing one form of design or pattern which may be applied to the surface of the unit, Fig. 4 is an enlarged fragmentary sectional elevation of the portion of the unit shown in Fig. 3, Fig. 5 is an elevation of a modified form of unit, indicating a different form of pattern that may be applied thereto, Fig. 6 is an enlarged fragmentary sectional elevation of the form of unit shown in Fig. 5, Fig. 7 is an elevational view of the reverse side of the unit of Fig. 5, the view indicating a different style of finish from that presented by the surface of the unit shown in Fig. 5, Fig. 8 is an elevational view showing a still different type of a pattern and finish which may be applied to the unit, Fig. 9 is an enlarged fragmentary sectional elevation of the unit of Fig. 8, Fig. 10 is an elevational view of still another form of modification, Fig. 11 is an enlarged fragmentary sectional elevation of the form of unit shown in Fig. 10, Fig. 12 is a view generally similar to Fig. 8, but showing the application of fracture lines to the unit, whereby a large slab may be broken readily into smaller sizes of units as may be desired, Fig. 13 is an enlarged fragmentary sectional elevation of the modification shown in Fig. 12, Fig. 14 is an elevational view generally similar to the showing of Fig. 10, but showing a still further modification of the surface finish, Fig. 15 is an enlarged fragmentary sectional elevation of the modification of Fig. 14, Fig. 16 is an elevational view of still a different modification, the view illustrating the application of a desired pattern to a unit having an asphaltic or bituminous body.

Fig. 17 is an enlarged fragmentary sectional elevation of the modification of Fig. 16, and with Fig. 16, showing a fracture line impressed in the body of the unit, Fig. 18 is another modification of an asphaltic unit, showing a still different finish and appearance presented by the unit, Fig. 19 is an enlarged fragmentary sectional elevation of the modification of Fig. 18, Fig. 20 is an elevation of a further modification of a unit generally similar to Fig. 16, but produced with a different pattern on the reverse side, Fig. 21 is an enlarged sectional elevation of the unit of Fig. 20, Fig. 22 is a view generally similar to Fig. 18, but showing a different type of finish, Fig. 23 is an enlarged sectional elevation of a fragment of the unit of Fig. 22, Fig. 24 represents, diagrammatically, one form of means for applying fracture lines and patterns to a unit having a plastic body, Fig. 25 is a view similar to Fig. 24, but showing a manner of operating upon a non-plastic unit to apply fracture lines and to apply, as by printing, a desired pattern thereon, Fig. 26 is a diagrammatic view showing means for forming fracture lines in a sheet while in a plastic state, and for applying a mineral or granular finishing material to the unit over the background thereof, Fig. 27 is a view similar to Fig. 26 except that the application of fracture lines is omitted, and the finishing material is being applied only to the spaces defining the margins outlining the pattern on the surface of the unit, Fig. 28 is an elevation of the side of a printing and marking roller adapted for use in connection with a unit having a plastic body, Fig. 29 is an end view of the roller of Fig. 27, the view being taken along the line 28—28 of Fig. 27, looking in the direction of the arrows.

As is indicated on the drawings, the unit of this invention may be made of either a plastic material, such as an asphaltic or bituminous material, or in the form of a non-plastic base, such as a compressed asbestos fiber composition or board. The unit is formed in large sheets or slabs, which are adapted to be applied to a wall foundation by embedding the sheets or slabs individually in a layer of composition cement of suitably viscous and tacky properties, which will bond to both the foundation of the wall and to the sheet or slab being applied to the wall, and which will secure the sheet or slab in position during the setting period of the cement layer. No fastening instrumentalities are employed for the unit other than the bonding cement. This cement is sufficiently plastic to be applied to the wall foundation with a trowel or similar tool, and to be spread readily into a covering of desired uniform thickness by suitable manipulations of the tool. The slab or sheet comprising the present invention is then applied to the cement layer and pressed therein, the cement holding the sheet in place as the cement sets. It is preferable, of course, for the foundation of the wall to be flush and even, although any type of material may form the foundation, such as stucco, brick, or wood. Suitable patterns and finishes may be applied to the sheets or slabs forming the units of the present invention, as will be described in more detail hereinafter, such being applied, of course, before the sheets are put in position on the wall.

In Fig. 1, the foundation 30 of the wall is shown as being made of stucco, mortar, or the like, and it has a layer 32 of composition cement applied thereto, this cement being of the characteristics referred to above. Embedded suitably in the cement layer 32 is a sheet or slab 34, defining a unit formed in accordance with the present invention. The unit 34 of Fig. 1 is represented as being of a plastic base such as an asphaltic or bituminous composition which is substantially non-tacky at ordinary atmospheric temperatures, but which is rather soft under working conditions, as will be brought out in greater detail hereinafter. The surface of the sheet 34 may be marked to simulate brick, or tile, or any other desired ornamental design or pattern. The sheet or slab 34 is bonded to the wall foundation 30 by the cement layer 32.

In Fig. 2, the wall foundation is illustrated for purposes of illustration as being composed of the conventional weather-boarding 30a, to which are applied in a suitable manner the inserts 36 so that a flush and even surface is presented for the application of the cement layer 32, which is the same as the layer 32 illustrated in Fig. 1. The sheet 34 is then applied to the cement layer in the same manner as in Fig. 1. In Fig. 2, the sheet 34 is illustrated as being made from a non-plastic, rigid composition, such as asbestos fiber board, for example.

It is thought that the manner of applying the sheets forming the units of the present invention will be clear from the above description and from Figs. 1 and 2.

It has been mentioned above that various designs and patterns or finishes may be applied to the sheets of the present invention, in order that varying appearances may be obtained, and such designs and finishes may differ on the reverse sides of the sheets, which are thereby rendered reversible in their application, depending on whatever the desired appearance is to be produced.

Thus, in Figs. 3 and 4, the base 36 is shown as being provided on one side with strips of color 38 and 40, which have been applied to the base 36 by any suitable process, as by a printing process, the other side of the base 36 being provided with a layer 42 of suitably colored material, which coloring may be applied solidly if desired over the entire surface of the base. The lines 38 and 40 are applied so as to be of equal thickness, as shown in an exaggerated manner in Fig. 4, so as to provide a flush surface at their intersections. The base 36 is illustrated as being of a relatively soft, plastic material, such as asphalt or bitumen, which, however, is non-tacky and non-flowing under atmospheric temperatures. A method of applying the desired patterns will be indicated hereinafter.

In Figs. 5, 6, and 7, there is illustrated a modification in which a non-plastic base 44 has applied thereto on one side a solid color 46, which terminates short of the margin, the margin being finished by a strip of contrasting color 48 extending around two sides of the unit, as shown in Fig. 5. As will be seen from Figs. 6 and 7, the reverse surface of the unit may have applied thereover a colored layer 50 of granulated material, such as a mineral or slate substance impregnated with a desired coloring, and united with the base 44 by the application thereto of a suitable adhesive. A contrastingly colored border 52 also of granular mineral material is shown as extending around two sides of the unit.

Fig. 8 shows also the non-plastic base 44, one surface of which has a roughened surface and which has applied to it colored lines 56 of granular material, simulating roughened mortar lines, and dividing the surface of the sheet or slab into a pattern simulating brickwork, similar to the showing in Figs. 1 and 2. The reverse side 58 of the base 44 is shown as being substantially flat and plain. In applying the lines 56, the base 44 is grooved by milling cutters, and the colored granulated material is applied to the grooves desirably in accordance with the procedure to be described hereinafter.

In the modification shown in Figs. 10 and 11, the non-plastic base 44 is provided with a roughened fibrous surface 60, which is rabbeted around adjacent edges as indicated at 62, and the rabbeted portion 62 is substantially filled with a line 64 of contrasting color, this line extending around the rabbeted edges, and filling the cut to substantially flush with the surface 60. The reverse side 66 is substantially plane.

In the modification shown in Figs. 12 and 13, the base 44 is provided on one side with a granular background 68, which is marked into a suitable pattern by substantially smooth lines 70 which simulate mortar lines and divide the surface of the slab into a pattern generally simulating brick work. As shown in Fig. 12, the unit is provided with breakage lines or cuts 72, which extend into the base 44 of the unit sufficiently deeply to enable the sheet or slab of the unit to be fractured along these breakage lines when it is desired to use less than a full-sized sheet of the material. The reverse side 74 of the unit is shown as being substantially plane, but it may also be provided with any desired pattern or finish.

In Figs. 14 to 15, one side of the base 45 is shown as being covered with colored granular material 76, a marginal border 78 of granular material of a contrasting color being applied along adjacent edges. The reverse side 80 is shown as being substantially smooth, but it may be colored as desired, so that the sheet may be reversed and applied to the wall with either side out.

In the modification of Figs. 16 and 17, the relatively soft, pliable base 36 is shown as having grooves 80 impressed therein, thereby defining a pattern as indicated by Fig. 16. Granular material 82 is applied to both the grooves 80 and the intervening areas forming the background of the unit. The granular material in the grooves may be of a color contrasting with the color of the background areas. The reverse side 84 of the unit is shown as being plane, but of course it may be finished in any desired manner, as has been described previously.

In Figs. 18 and 19, the plastic base 36 is shown as being rabbeted along adjacent edges, granular material being applied to the surface of the base and also to the rabbeted portion. The border material may be preferably of a contrasting color with respect to that used on the remaining portions of the surface; and as before, any desired design may be applied to the reverse surface 88, which is plane, however. It will be observed in Figs. 16 to 19 that the unit is provided with rabbeted edges on one side, the other side being plane, so that when the sheet or slab is applied to a wall with the grooved and rabbeted side outwardly, it will give the appearance of a rake-jointed wall, while if applied with the plane surface outwardly, it gives the appearance of a flush wall. Suitable fracture lines, one of which is indicated at 90 may be cut or impressed in the base 36 as desired.

In Figs. 20 and 21, the grooves 92 are impressed in the relatively soft and plastic base 36 and colors 94 are applied in the grooves to simulate a rake-jointed brick wall. The reverse side is made flush, with contrasting colors 96 and 98 applied thereto to produce the desired pattern.

Fracture lines 100 are cut or impressed in the base 36, as will be apparent, thus enabling a sheet to be broken as desired along predetermined lines.

In Figs. 22 and 23, the sheet is shown as being rabbeted along adjacent edges, and the resulting rabbeted edges are provided with a colored border 102. The reverse side is shown as being plane, and covered with a granular finish 104 the border 106 being of a contrasting color if desired.

In Figs. 24 to 27, inclusive, there are shown various ways of producing the units as previously described.

In Fig. 24 there is shown a sheet 108 of a relatively soft, bituminous composition and which forms a complete unit of this invention. A driving roller 110 cooperates with a roller 112 which revolves in the direction of the arrow 114, so as to move the sheet 108 in the direction of the arrow 116, and which impresses the pattern into the sheet 108.

Although the construction of the roller 112 may be widely varied, a suitable construction is shown in Figs. 28 and 29, from which it will be seen that the surface of the roller may be roughened, as indicated at 118, for imparting a correspondingly roughened or pebbly finish 120 to the sheet 108. Also across the surface of the roller, there extend a plurality of ribs 122, and a circumferential rib 124, these ribs serving to impress the markings of the design into the body of the sheet 108, there resulting a design such as shown in Figs. 12 and 16, as indicated by the grooves 126 on Fig. 24.

The roller 112 may be provided also with a sharpened circumferential edge 128, which acts as a knife edge for cutting breakage lines 109 in the sheet 108, similarly as shown in Figs. 12 and 16, for example, and the ribs 122 may be provided with cutters 234.

After passing the roller 112, the sheet 108 passes beneath the printing roller 130, which is desirably made of rubber in view of the relative softness of the sheet 108. The roller 130 is provided with longitudinal ribs 132 and circumferential ribs such as indicated at 134, these ribs corresponding to the ribs of the roller 112. The movement of the sheet 108 rotates the roller 130 in the direction of the arrow 136.

The roller 130 engages a color-applying roller 138, this latter roller dipping into a body of color 140 contained in a container 142. The roller 138 is revolved in the direction of the arrow 144, and it becomes coated with color, transferring it to the ribs on the roller 130 by virtue of its engagement with the roller 130, the ribs on the roller 130 depositing the coloring in the grooves of the pattern impressed in the sheet 108, as indicated, for example, in Fig. 20.

A somewhat similar operation is designated by Fig. 25, which shows similar manipulations applied to a hard, non-plastic sheet 146, such as compressed asbestos fiber board, for example.

For making the breakage lines, in view of the hardness of the sheet, a toothed roller 148 is used, which is provided with saw teeth 150 for cutting the breakage lines, such as is indicated at 152. In order to form grooves in the sheet 146 such as indicated in Fig. 8, for example, the cutter 148 may be replaced by a milling cutter, or such a milling cutter may be used in conjunction with the cutter 148, in a manner which will be obvious. The sheet 146 is moved in the direction of the arrow 154 by suitable feeding mechanism, not shown, the cutter 148 being power-driven from a suitable source of power, not shown.

A printing roller 154, of a construction generally similar to the printing roller 130, of Fig. 24, is used to apply coloring. The roller 154 is made of a hard material, such as metal, in view of the hardness of the sheet 146, and it has a smooth surface. The coloring is applied to the ribs 156 by engagement thereof with the roller 158 dipping into a body of coloring 160 held in a receptacle 162, there being produced a pattern generally similar to that shown in Fig. 8.

In Fig. 26, there is shown the application of a granular material to the background of the surface of the sheet, as indicated, for example on Fig. 12, it being understood that the sheets are first formed in plastic condition, and subsequently setting into a hardened state.

In accordance with this view the plastic sheet 146, is moved in the direction of the arrow 168 by the rollers 170 and 172, which are driven from any suitable source of power, not shown. As has been previously described, the roller 112a, which is similar to roller 112 except for being smooth-surfaced, forms the breakage line 152 in the sheet 146 in a manner similar to that described in connection with Fig. 24. The roller 164 is provided with recesses 166 in the periphery of the roller, these recesses extending longitudinally of the roller. The roller 164 rotates in the direction of the arrow 174, and it engages a roller 176 which dips into a body of liquid adhesive material 178 which is contained in a container 180. The contact between the roller 164 and the roller 176 rotates the latter in the direction of the arrow 182, so that the roller 176 becomes coated uniformly with the adhesive material 178, and transfers this material to the roller 164, which roller in turn applies the adhesive to the back-ground of the sheet 146, the margins between the pattern lines being left clear of the adhesive.

Upon the surface of the sheet which has been prepared in this manner, there is distributed a granular mineral material 184, from a supply of such granular mineral material contained in a hopper 186, which hopper is provided with a cover 188 and which discharges into a funnel-shaped distributor 190 which has a discharge spout 192 extending across the sheet 146.

It will be seen that the rollers 170 and 172, cooperate not only to move the sheet through the apparatus, but also to press the mineral material 184 into the surface of the adhesive, so as to give a uniform coating of the granular material over the surface of the sheet.

It will be seen that the hopper 186 is provided with a pipe 194 which opens adjacent to the surface of the sheet after the granular material has been applied and rolled, a suction being created through the pipe 194 by means of a suction fan, or the like, 196, which pulls air through the pipe 198 opening into the cover of the hopper 186, thereby tending to create a vacuum in the hopper 186 and thereby drawing up from the surface of the sheet any excess of the granular material which may have been deposited thereon. Such excess of granular material thus is drawn up through the pipe 194 into the hopper 186.

Obviously, if desired, suitable coloring material may be applied to or mixed with the granular material in the hopper 186 in order to provide a desirably colored finish to the surface of the sheet.

In Fig. 27, there is shown a generally similar arrangement to the arrangement shown in Fig. 26, except that the parts illustrated in Fig. 27 are used to apply granular materials to the margins between the design of the pattern on the sheet, leaving the background of the sheet clear of the granular material.

In Fig. 27 the sheet 108 is represented as being of soft material of the bituminous or asphaltic composition, as has been referred to above in connection with Fig. 24. The roller 200 may be similar to the roller 130, the roller 200 engaging the roller 202 which dips into a body of adhesive 204 contained in a suitable receptacle 206. The adhesive material coats the roller 202 as the latter rotates in the direction of the arrow 208, this adhesive being applied to the circumferential ribs of the roller 200 such as is indicated, for example, by 210. In this manner the adhesive is applied to the spaces between the pattern which has been suitably impressed or printed on the sheet, as described above in connection with Fig. 24, a layer 212 of granular material being supplied from the hopper 214 and distributor 216, the material 212 being pressed into the surface of the sheet 108 and into the adhesive thereon by the action of rollers 218 and 220 which revolve in the direction of the arrows 222 and 224 respectively, at least one of the rollers 218 or 220 being a power actuated roller operated from a suitable source of power, not shown.

Excess of deposited mineral matter is drawn up through the pipe 228 by the suction fan 230, thereby being returned to the hopper 214.

In addition to exerting compressional force on the mineral material 212, the rollers 218 and 220 serve to move the sheet 108 in the direction of the arrow 232.

It will be apparent, of course, that various instrumentalities may be combined with those shown in Figs. 24 to 27, inclusive, as may be desired or required to produce any desired effects as to design and coloring as may be determined upon for any given use or adaptation of the resulting unit.

It will be apparent, therefore, that the reversible unit of the present invention may present many different appearances or designs depending upon the finish that is given to it. Thus, the unit may be provided with colored mortar lines on both sides with a crushed or granular slate-like material bonded to the surface; or the surface may be provided with a rough fibrous finish, suitably colored, as where the unit is made up from a compressed asbestos composition thereby presenting at least on one surface, the roughness of the fibers comprising the body of the unit. The reverse side of the plate may be finished smoothly if desired, or it may have a rough finish produced by bonding thereto a colored granular material. Borders of contrasting colors may also be applied.

Attention has been called to the fact that the plates or slabs forming the improved unit are bonded in position by embedding the unit in a suitable adhesive, as cement 32. Such a cement which is especially suitable for the purpose is formed by mixing Portland cement with a mixture of asbestos fiber and some other fibrous material which will serve to felt the asbestos fiber and to provide additional body to the cement while preventing deformation of the wall structure by preventing tendency of buckling of the embedded plates during the setting of the cement, such felting fibrous material being cotton fibers, rock wool fibers, or the like. In practice about three parts by weight of the total fibrous materials, composed of substantially equal parts of asbestos and felting fibers, are mixed with approximately one part by weight of Portland cement, and commingled with a tenacious tarry liquid such as liquid asphalt or tar in sufficient quantities to make a workable paste. The resulting cementitious material may be spread with a trowel or similar tool, and when the plates are embedded therein, it will tightly bond the plates to the foundation during the setting of the cement, and permanently uniting the plates in position.

It will be seen from the drawings, (see, for example, Figs. 12 and 20) that the breakage lines may extend in both directions of the unit. This may be accomplished by providing the roller 112 with cutting edges 234 on the ribs 122, which cutting edges cooperate with the circumferential cutting edge 128; and it will be noted further that these breakage lines are applied so that when the large plates are fractured, the small divisions will be provided with wide borders on adjacent edges, that is, along a long edge and a short edge.

What is claimed is:

1. A reversible building unit comprising a flexible sheet adapted to be cemented to a building wall, the said sheet comprising a body having opposing faces, one of the said faces having applied thereto areas of contrasting color to simulate a brick construction with mortar lines therebetween, the opposing face having applied thereto a pattern of a contrasting nature with respect to the simulated brick pattern, and fracture lines in the sheet enabling the sheet to be divided into smaller portions defining one or more individual units.

2. A reversible building unit consisting of a sheet comprising a body having substantially rectangular faces, grooves formed in at least one of the faces to divide the said face into areas of relief and depression, fracture lines between the areas in relief, a finish of predetermined color applied to the relief areas and a contrasting color applied to the depressed areas, thereby forming a pattern simulating brick work with simulated mortar lines between the brick, the opposing surface of the sheet being substantially entirely plane, whereby the sheet when assembled with similar sheets in a wall structure with the uneven face outward presents the appearance of a brick wall having rake joints between the sheets, while when assembled with the opposite faces of the sheets outward presents the appearance of a flush-jointed wall, the said fracture lines enabling the sheet to be divided into smaller portions defining one or more individual units.

ANTOINETTE REISIG.